Patented Apr. 17, 1923.

1,452,478

UNITED STATES PATENT OFFICE.

CARLETON ELLIS, OF MONTCLAIR, NEW JERSEY.

PROCESS OF MAKING NICKEL FORMATE.

No Drawing.  Application filed March 21, 1921. Serial No. 453,989.

*To all whom it may concern:*

Be it known that I, CARLETON ELLIS, a citizen of the United States, and a resident of Montclair, in the county of Essex and State of New Jersey, have invented certain new and useful Improvements in Processes of Making Nickel Formate, of which the following is a specification.

This invention relates to a process of making nickel formate suitable for use in the manufacture of catalyzer for the hydrogenation of oils and the like and relates especially to the preparation of this nickel salt by reacting on nickel sulphate with sodium formate or other suitable soluble salt or formic acid. In making a nickel catalyzer for the hydrogenation of oils it is desirable to have the product quite free of sulphates. One method of producing nickel formate has been that of precipitating nickel from a solution to form the hydrate and after washing the precipitate dissolving the latter in formic acid. This process involves considerable manipulation and expense especially as the reagents employed are more costly than the nickel sulphate and sodium formate used directly in accordance with the present invention; so that the process herein involves a cheapening of the cost of manufacture of nickel formate of good quality.

In order to bring about substantially complete reaction between nickel sulphate and sodium formate hot solutions should be used and are best heated to boiling. The concentration of the solution is of great importance as in too dilute a solution nickel formate would not separate advantageously, while in too concentrated a solution sodium sulphate would collect with the nickel formate and impair its purity. While nickel formate is fairly insoluble in cold water it is an extremely difficult matter to wash out nickel sulphate once the latter has crystallized with the nickel formate.

An example will make the method employed in the preferred procedure of the present invention sufficiently clear to enable the invention to be readily practiced. 280 lbs. of nickel sulphate are dissolved in about 250 lbs. of boiling water and the solution filtered. 160 lbs. of sodium formate which in the ordinary commercial form contains sodium carbonate is dissolved in 150 lbs. of boiling water and the solution neutralized with formic acid and then filtered. Commercial formic acid of 60% strength may be used for this neutralization step. The filtered solutions of nickel sulphate and sodium formate are mixed and water added to bring the strength to about 22° Bé. The solution is then boiled and concentrated to a strength of 37–38° Bé., at this point the major portion of the nickel formate will be found deposited from the solution. The latter is then filtered as for example by pumping through a filter press or in any other suitable manner and the nickel formate is washed with cold water until the wash waters are substantially free from sodium sulphate. The material may be dried at 212–220° F. and will dry at this temperature without darkening. From the foregoing procedure a yield of 151 lbs. of nickel formate or approximately 80% of the theoretical quantity was obtained in the form of the high grade salt suitable for use in the hydrogenation of oils. Of course the residual liquors contain additional quanties of the formate and these liquors may be worked up in the course of the manufacturing operation to utilize their saline values. A catalyzer made from nickel formate prepared as above was tested for catalytic activity and was found to be highly active.

During the boiling down or concentration of the nickel formate solution as set forth above the strength of the solution should be determined with nickel formate in suspension. For example when the strength under these conditions reaches 37–38° Bé. it will be found that the clear solution will show a strength more nearly approximating 32–33° Bé. If the concentration is carried beyond 38° Bé. sodium sulphate is thrown out of solution and is very difficult to wash out without a substantial loss of nickel formate.

It is preferable that the nickel formate be filtered from the mother liquor while hot otherwise sodium sulphate will crystallize from the solution. In fact at the strength given above it is essential that filtration be carried out hot in order to avoid the formation of sodium sulphate.

The product thus obtained is in the form of minute crystals and when dry may be readily brushed through a sieve having 100 meshes to the inch.

According to the foregoing therefore it will be observed that in carrying out the present invention nickel sulphate and sodium formate are allowed to react in approximately their molecular proportions and in boiling concentrated solution to yield nickel formate which separates while sodium sulphate is maintained largely in solution; the essential feature being to carry the concentration as far as possible to yield the maximum amount of nickel formate and at the same time not to overstep the point at which sodium sulphate separates and contaminates the nickel formate.

Variations in the proportions of the foregoing are possible to a greater or less degree and in some cases for example sodium formate may be used without neutralization yielding when the crude sodium formate contains free sodium carbonate a certain amount of nickel carbonate which will be separated with the nickel formate and in fact may form a double compound, the formo-carbonate of nickel. Nickel containing cobalt likewise may be used or cobalt or other formates may be prepared in a similar manner.

What I claim is:—

1. The process of making nickel formate adapted for use in the hydrogenation of oils which comprises forming a solution containing both nickel sulphate and sodium formate and concentrating such solution to a strength of about 37° Bé. to deposit nickel formate, in filtering and washing the latter.

2. The process of making nickel formate which comprises reacting on nickel sulphate with sodium formate in boiling solution and concentrating to a strength of about 37° Bé. whereby nickel formate is produced and separates from solution, in filtering, washing and drying such separated nickel formate.

CARLETON ELLIS.